(12) United States Patent
Nussio et al.

(10) Patent No.: US 6,688,578 B1
(45) Date of Patent: Feb. 10, 2004

(54) ELECTROMAGNETIC ACTUATOR FOR A FUEL INJECTOR HAVING AN INTEGRAL MAGNETIC CORE AND INJECTOR VALVE BODY

(75) Inventors: Randy Nussio, Grand Rapids, MI (US); Brent Brower, Byron Center, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/338,595

(22) Filed: Jan. 8, 2003

(51) Int. Cl.$^7$ ............................................... F16K 31/02
(52) U.S. Cl. ............................ 251/129.15; 251/129.01
(58) Field of Search ..................... 251/129.01–129.22

(56) References Cited

U.S. PATENT DOCUMENTS

| | | | |
|---|---|---|---|
| 4,387,739 A | * | 6/1983 | Schaming ............. 201/129.15 |
| 4,399,836 A | * | 8/1983 | de Versterre et al. ... 251/129.05 |
| 5,072,205 A | | 12/1991 | Arakawa et al. |
| 5,085,402 A | | 2/1992 | O'Dell |
| 5,143,345 A | * | 9/1992 | Miki et al. ............. 251/129.15 |
| 5,188,336 A | | 2/1993 | Graner et al. |
| 5,549,816 A | | 8/1996 | Harp et al. |
| 5,996,910 A | | 12/1999 | Takeda et al. |
| 6,045,116 A | | 4/2000 | Willke et al. |
| 6,273,395 B1 | | 8/2001 | Palma et al. |
| 6,328,222 B1 | * | 12/2001 | Warner et al. ........... 239/585.1 |
| 6,336,621 B1 | | 1/2002 | Ii et al. |
| 6,565,020 B1 | * | 5/2003 | Fischer et al. ........... 239/585.1 |

* cited by examiner

Primary Examiner—Paul J. Hirsch
(74) Attorney, Agent, or Firm—Brooks Kushman P.C.

(57) ABSTRACT

An electromagnetic actuator for a fluid pressure control valve in a fuel injector for an internal combustion engine is disclosed. The actuator comprises a valve body having an opening therein and a bore extending at least partially therethrough. A control valve having an armature attached thereto is inserted into the bore in the valve body. A magnetic core, encircled by windings, is located in the opening in the valve body. A valve spring biases the armature away from the magnetic core. The windings, when energized, produce a magnetic circuit that includes the valve body, magnetic core, armature, and retainer ring to attract the armature towards the magnetic core.

7 Claims, 3 Drawing Sheets

ELECTROMAGNETIC ACTUATOR FOR A FUEL INJECTOR HAVING AN INTEGRAL MAGNETIC CORE AND INJECTOR VALVE BODY

BACKGROUND OF THE INVENTION

1. Field of the Invention

The invention relates to electromagnetic actuators for a control valve of a fuel injector for internal combustion engines.

2. Background Art

Co-pending U.S. patent application Ser. No. 10/197,317, filed Jul. 16, 2002, entitled "Electromagnetic Actuator and Stator Design in a Fuel Injector Assembly" now U.S. Pat. No. 6,565,020, discloses an injector assembly for an internal combustion engine wherein a plunger body, a valve body and nozzle assembly are arranged in a linear, stacked relationship. The valve body encloses a magnetic core. The magnetic core is surrounded by windings that are energized to create a magnetic circuit, which creates a magnetic force that draws an armature connected to a control valve towards the magnetic core to close the control valve. The magnetic core has a generally E-shaped cross section having a central inner portion and outer portions. The magnetic circuit comprises the central portion of the magnetic core, the armature, and the outer portions of the magnetic core.

The co-pending patent application and U.S. Pat. No. 6,565,020 are owned by the assignee of the present invention.

The separate magnetic core components of the design of the co-pending patent application are assembled with the valve body prior to assembling the control valve and valve actuator. It would simplify manufacture of the fuel injector if the magnetic core could be made integral with the valve body. Such a core design also would be more economical to manufacture than a magnetic core with separate components.

SUMMARY OF THE INVENTION

The electromagnetic actuator of the invention is adapted for use with a control valve module described in the co-pending application identified above.

The actuator of the invention comprises a modular valve body having an opening therein and a coaxial bore extending at least partially through the valve body. A control valve, having an armature attached thereto, is inserted into the bore in the valve body. A magnetic core, encircled by windings, is inserted into the opening in the valve body. A valve spring biases the armature away from the magnetic core, and a retainer ring holds the windings and the magnetic core in the opening in the modular valve body. The windings, when energized, produce a magnetic circuit that includes the modular valve body, magnetic core, armature, and retainer ring to attract the armature towards the magnetic core.

The valve body of the actuator of the invention comprises an integral part of the magnetic circuit, unlike the magnetic core of generally E-shaped cross-section in the design disclosed in the co-pending application. The invention simplifies the manufacturing and assembly process and reduces the cost of the fuel injector. If the inner portion of the core is formed by laminated windings, the magnetic performance of the actuator is enhanced.

In accordance with one embodiment of the invention, both the inner and outer magnetic core portions are made as a part of the valve body, which eliminates the need for a separate inner core portion. The core windings are held in place by a retainer ring. In accordance with another embodiment of the invention, the retainer ring can be eliminated if the armature is sized to overlie the core windings. Thus, the windings can serve the secondary function of a retainer. Such a design would be useful if the resulting increased mass of the armature is not detrimental to the effective performance of the injector.

DETAILED DESCRIPTION OF THE PREFERRED EMBODIMENT

Figure 1:
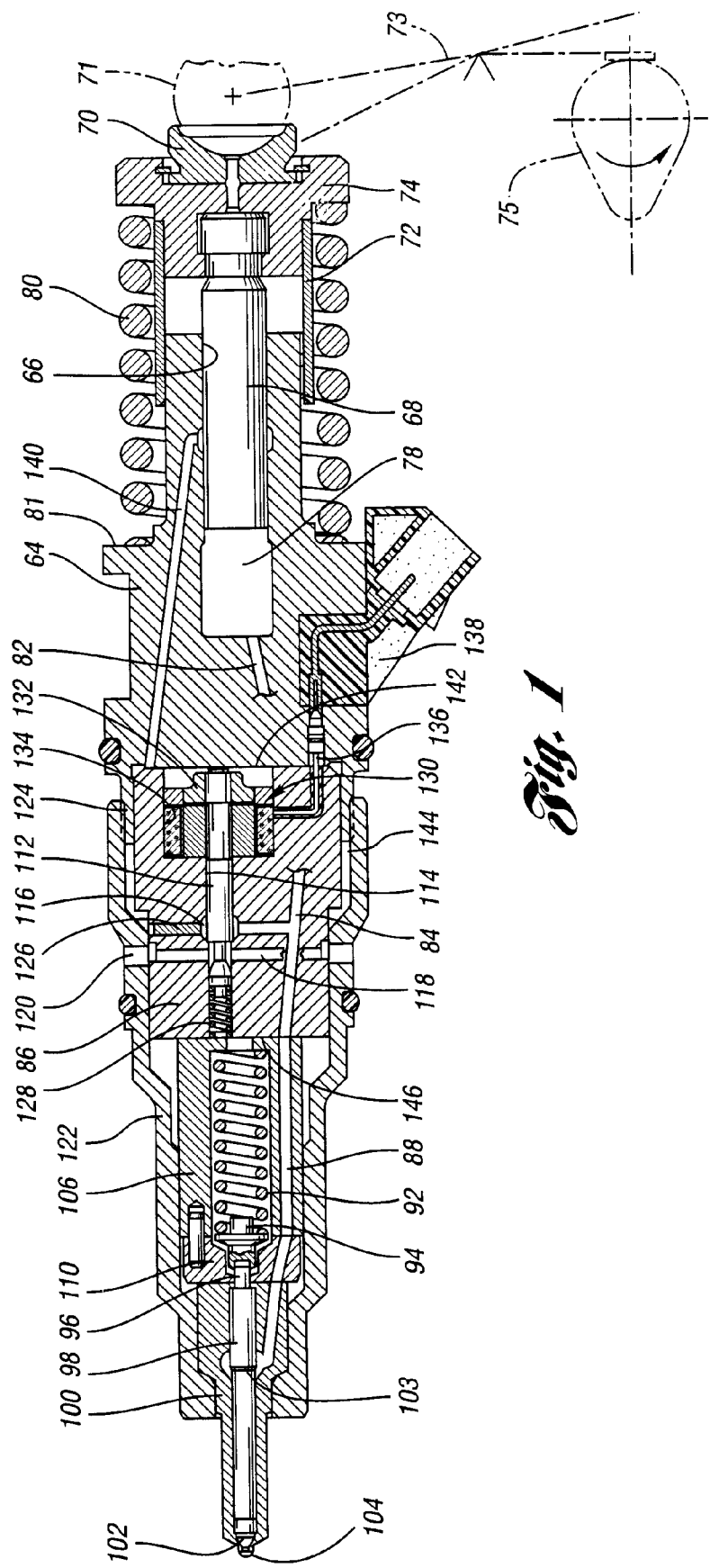
FIG. 1 is a cross-sectional view showing the overall assembly of an injector that incorporates the electromagnetic actuator of the invention.

Referring now to the drawings, an injector assembly, including the actuator of the present invention, includes a relatively small pump body 64. A central pumping cylinder 66 in body 64 receives plunger 68. A cam follower assembly 70 includes a follower sleeve 72 and a spring shoulder element 74. The follower assembly 70 is connected to the outer end of plunger 68. The cylinder 66 and plunger 68 define a high-pressure cavity 78. The plunger is urged normally to an outward position by plunger spring 80, which engages the shoulder element 74 at the outer end of the plunger. The inner end of the spring is seated on a spring seat 81 of the pump body 64.

The cam follower assembly 70 is engageable with a surface 71 of an actuator assembly shown at 73, which is driven by engine camshaft 75 in known fashion. The stroking of the piston creates pumping pressure in chamber 78, which is distributed through an internal passage 82 formed in the lower end of the pump body 64. This passage communicates with the high-pressure passage 84 formed in valve body 86. The opposite end of the passage 84 communicates with high-pressure passage 88 in a spring cage 106 for needle valve spring 92.

The spring 92 engages a spring seat 94, which is in contact with the end 96 of a needle valve 98 received in a nozzle element 100. The needle valve 98 has a large diameter portion and a smaller diameter portion, which define a differential area 103 in communication with high-pressure fuel in passage 88. The end of the needle valve 98 is tapered, as shown at 102, the tapered end registering with a nozzle orifice 104 through which fuel is injected into the combustion chamber of the engine with which the injector is used.

When the plunger 68 is stroked, pressure is developed in passage 88, which acts on the differential area of the needle valve and retracts the needle valve against the opposing force of needle valve spring 92, thereby allowing high-pressure fuel to be injected through the nozzle orifice. Spring 92, located in the spring cage 106, is situated in engagement with the end of the pocket in the spring cage occupied by spring 92. A spacer 110, located at the lower end of the spring cage 106, positions the spring cage with respect to the nozzle element 100. A locator pin can be used, as shown in FIG. 1, to provide correct angular disposition of the spacer 110 with respect to the spring cage 106.

Figure 2:
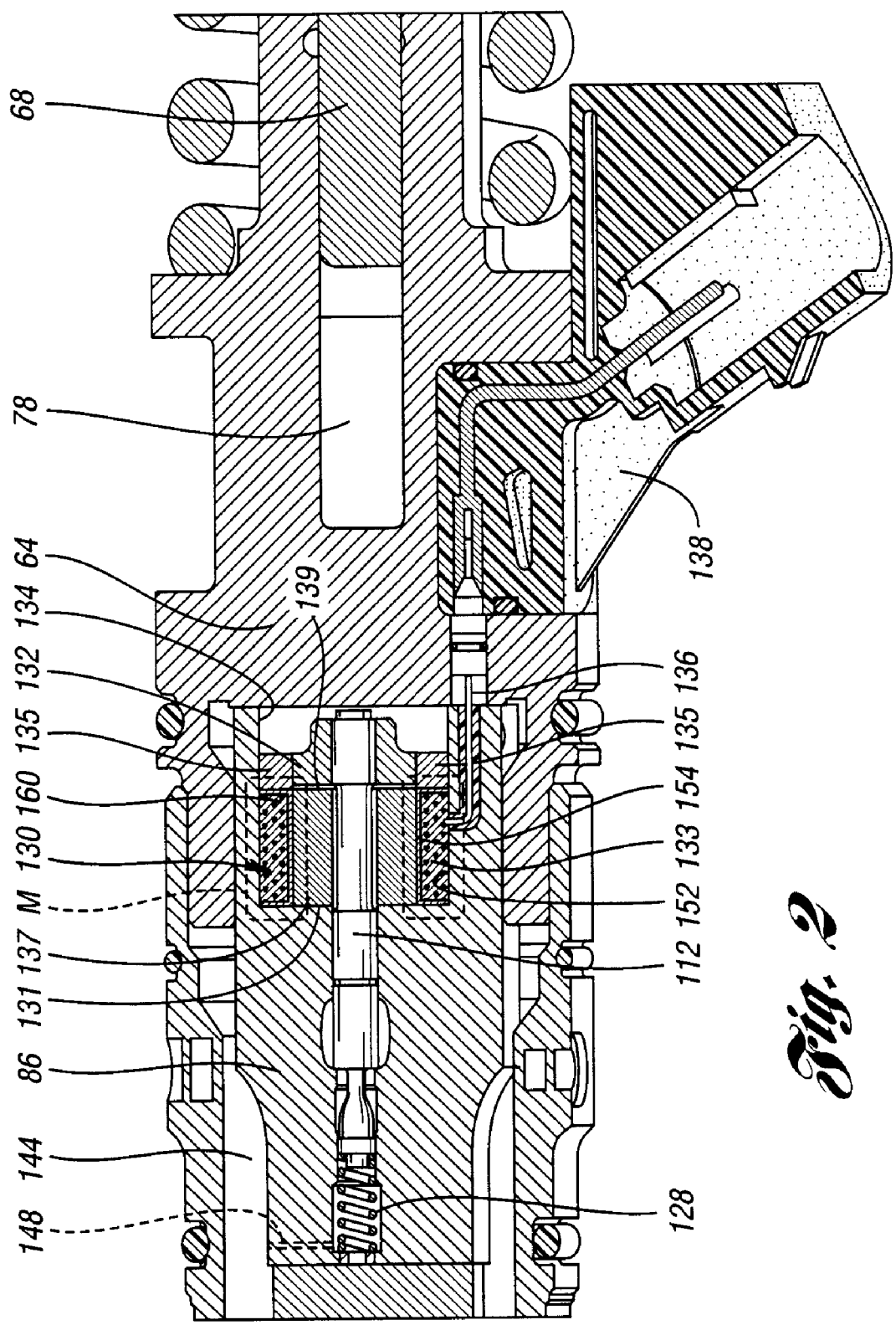
FIG. 2 is an enlarged partial cross-sectional view showing the stator design and electrical connector of the invention.

A control valve 112 is located in a cylindrical valve chamber 114. A high-pressure groove 116 surrounding the valve 112 is in communication with high-pressure passage 84. When the valve is positioned as shown in FIG. 2, the valve 112 will block communication between high-pressure passage 84 and low-pressure passage or spill bore 118, which extends to low-pressure port 120 in the nozzle nut 122.

The nozzle nut 122 extends over the valve module 86. It is threadably connected at 124 to the lower end of the pump body 64.

The connection between passage 84 and groove 116 can be formed by a cross-passage drilled through the valve body 86. One end of the cross-passage is blocked by a pin or plug 126.

The end of control valve 112 engages a control valve spring 128 located in valve body 86. This spring tends to open the valve and to establish communication between high-pressure passage 84 and low-pressure passage 118, thereby decreasing the pressure acting on the nozzle valve element.

Valve 112 carries an armature 132, which is drawn toward stator 130 when the windings of the stator are energized, thereby shifting the valve 112 to a closed position and allowing the plunger 68 to develop a pressure pulse that actuates the nozzle valve element.

The stator 130 is located in a cylindrical opening 134 in the valve body 86. The valve 112 extends through the central opening and valve chamber 114 in the stator assembly. The windings of the stator assembly extend to an electrical terminal 136, which in turn is connected to an electrical connector assembly 138 secured to the pump body 64. This establishes an electrical connection between a wiring harness for an engine controller (not shown) and the stator windings.

A low-pressure passage 140 is formed in the pump body 64. This communicates with a low-pressure region 142 at the stator assembly and with a low-pressure region 144, which surrounds the valve body 86. Fluid that leaks past the plunger 68 during the pumping stroke is drained back through the low-pressure passage 140 to the low-pressure return port 120.

The interface of the upper end of the spring cage 106 and the lower end of the valve body 86 is shown at 146. The mating surfaces at the interface 146 are precisely machined to provide flatness that will establish high-pressure fluid communication between passage 88 and passage 84. The pressure in spring cage 106, however, is at the same pressure that exists in port 120. This is due to the balance pressure port 148, seen in FIGS. 2, 3 and 4, whereby the chamber for spring 128 communicates with the low-pressure region surrounding the valve body 86.

The interface between the upper end of the valve body 86 and the lower end of the pump body 64 is shown in FIG. 2. The upper surface of the valve body 86 and the lower surface of the pump body 64 are precisely machined to establish high-pressure fluid distribution from passage 82 to passage 84. The seal established by the mating precision machined surfaces at each end of the valve module 86 eliminates the need for providing fluid seals, such as O-rings.

The assembly of the pump body 64, the valve module 86, the spring cage 106 and the nozzle element 100 are held in stacked, assembled relationship as the nozzle nut 122 is tightened at the threaded connection 124, seen in FIG. 1. The module, the spring cage and the nozzle element can be disassembled readily merely by disengaging the threaded connection at 124, which facilitates servicing and replacement of the elements of the assembly.

The valve body contains a cut-out portion or opening 152 into which is fitted a bobbin 154 containing a plurality of windings 133. The windings 133 are electrically connected to the conductor 136, which in turn is electrically connected to connector assembly 138, as mentioned above. This provides electrical communication of the windings with the engine control system (not shown) for controlling the operation of the fuel injector. A magnetic inner core portion 137 is also inserted into the cut-out portion 152. A retainer 135 is inserted into the cut-out portion 152 to retain the bobbin 154.

Figure 3:
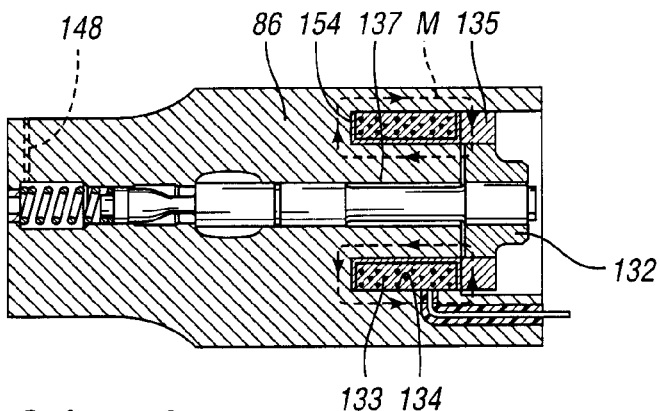
FIG. 3 is a cross-sectional view of one embodiment of the valve body having an integral magnetic core.
Figure 4:
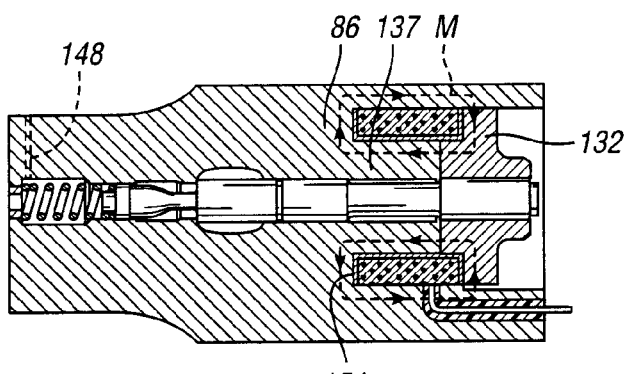
FIG. 4 is a cross-sectional view of another embodiment of the valve body having an integral magnetic core wherein a retainer ring for the windings is eliminated.

In the design of the co-pending patent application identified above, the magnetic circuit comprises a magnetic core of generally E-shaped cross-section. The valve body is not included as part of the magnetic circuit. However, in this invention, the valve body 86 is part of the magnetic circuit M, as shown in FIGS. 2, 3 and 4. This design is advantageous because it eliminates separate magnetic core components and allows, as in the case of the design of FIG. 2, a larger diameter wire and more turns to be designed into a same-size valve body compared to a conventional E-section core.

The valve spring 128 normally biases the control valve 112 to an open valve position. To close the control valve 112, the engine controller energizes the windings 133, which produces a magnetic flux circuit that flows through the magnetic core portion 137, the valve body 86, the retainer 135, and the armature 132. The magnetic circuit M creates a magnetic force that draws the armature 132 towards the stator 130.

In another embodiment illustrated in FIG. 3, the magnetic core portion 137 is an integral part of valve module 86 thereby further reducing the number of components. The bobbin 154 containing the windings 133 is inserted into opening 134 in valve body 86. In this case, the magnetic circuit M includes the valve module 86, the retainer 135, and the armature 132. This eliminates the need for a separate magnetic core.

In yet another embodiment illustrated in FIG. 4, the separate retainer ring shown in the previous figures has been eliminated. A press fit maintains the bobbin 154 in place in the control valve body 86. The modified armature 132 can be used with a separate magnetic core portion 137 (as shown in FIG. 2) or with an integral magnetic core (as shown in FIG. 3) producing magnetic circuits M that travel through the valve body 86, magnetic core portion 137, and armature 132 or the valve body 86 and armature 132, respectively.

Figure 5:
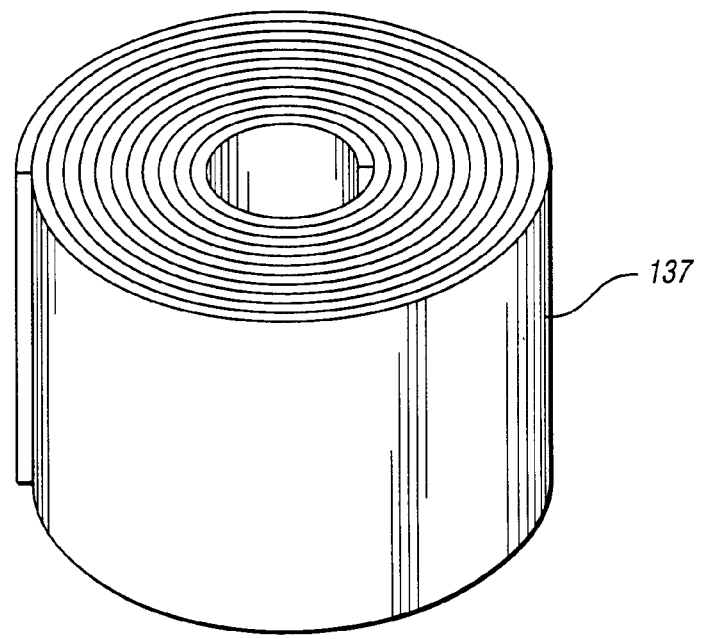
FIG. 5 is a perspective view of a round laminated core.

FIG. 5 illustrates another example of a magnetic core that can be used with the present invention. The magnetic core portion 137 shown in FIG. 5 comprises a laminated, wound, flat strip, preferably of high magnetic saturation metal. The laminated core minimizes the formation of eddy currents that are detrimental to the performance of the fuel injector. The eddy currents slow down the demagnetization process. Natural oxides that form on the metal strip reduce the formation of eddy currents by electrically isolating the rolled strip windings. Further eddy current reduction can be obtained by coating the strip with a nonconductive coating prior to rolling the metal strip.

Unlike the injector design of the co-pending patent application identified above, the magnetic core of each of the embodiments of the present invention does not have an outer circuit to conduct the magnetic flux. The valve body provides the outer path for the magnetic flux flow. The core diameter can be slightly increased to compensate for the reduction in the pole face area. In the case of the design of FIG. 3, the retainer ring shown at 135 completes the magnetic circuit between the armature and the valve body. Unlike the design of the co-pending patent application, the valve body and the core of the design of FIGS. 3 and 4 are not separate components since the valve body is part of the magnetic circuit. This eliminates parts from the overall assembly and simplifies assembly procedure while reducing cost further. Integration of the outer core portions with the valve body makes it possible to increase the volume of the magnetic wire windings. As previously mentioned, the design of the invention has the further advantage of enabling the designer to use larger diameter wire and more turns with the available module size. Since magnetic forces are proportional to the product of the amperage and the number of turns in an unsaturated state, the design of the present invention provides a higher force with lower resistance.

In the embodiment of the invention shown in FIGS. 1 and 2, the valve body, which is magnetized, is made from a high strength material, typically a high carbon steel, that provides fatigue resistance to high stress resulting from high injection pressure. High injection pressure is required for diesel fuel injection. The core portion 137 of FIG. 2 is made of magnetized material of high coercivity and high permeability and is retained in place against the adjacent surface of the valve body 86 by mechanical and magnetic forces. When the windings 133 are not energized, the residual magnetism of the valve body due to the high coercivity of the valve body retains the core in contact with the valve body. This complements the retention forces of the retainer ring and the bobbin, the latter being press-fitted in opening 134.

When the coils are energized, the air gap at 131 between the core and the valve body, seen in FIG. 2, is smaller than the air gap 139 between the armature and the core. Because of the larger air gap at 139, the magnetic forces will pull the armature toward the core. The force on core portion 137 at air gap 139 always will be less than the force at air gap 131 between the core and the valve body. Thus, a contact force between the core portion 137 and the valve body always will retain the core portion 137 securely in place when the magnetic circuit is either energized or non-energized.

The core and the bobbin can be encapsulated with a polymer, if that is desired, to form a more permanent assembly. This configuration may be desirable in some instances when high forces due to pressure or vibration tend to cause the magnetic core to move.

In the embodiment of FIG. 2, the magnetic circuit is completed as the magnetic flux travels through the valve body, through the retaining ring and through the armature. The armature and the retaining ring are soft magnetic alloys, which maximizes the magnetic performance. The magnetic force that closes the control valve is created at the air gap 139 between the armature and the core. A second air gap exists between the inner surface of the retaining ring and the outer surface of the armature. This air gap is designed with a minimum clearance so as to minimize the energy losses as the magnetic flux traverses the air gap. This is true also of the air gap between the retainer ring 135 and armature of FIG. 3.

The retaining ring 135 has a dual function of conducting magnetic flux and retaining the bobbin. This is desirable because more volume within the space limitations of the design is then made available for the magnetic windings rather than having an additional part to accomplish the retention function. Furthermore, in the case of the designs of FIGS. 1, 2 and 3, the mass of the armature is reduced because of the presence of the retaining ring 135. This improves the dynamic behavior of the design since the reduced mass makes it possible to improve the valve response to commands issued by the engine control system. In those instances, when the reciprocating mass of the armature is less important and the reduction of the number of components of the design is more critical, the armature 132 may be made as indicated in FIG. 4. This concept can be used also, of course, in the case of the embodiments of the invention illustrated in FIGS. 1 and 2.

Although embodiments of the invention have been disclosed, it will be apparent to persons skilled in the art that modifications may be made without departing from the scope of the invention. All such modifications and equivalents thereof are intended to be covered by the following claims.

What is claimed is:

1. An electromagnetic actuator for a fluid pressure control valve in a fuel injector for an internal combustion engine, the actuator comprising:

a control valve module having a valve body with an opening therein and a bore at least partially extending therethrough;

a control valve having an armature attached thereto, the control valve being inserted into the bore in the valve body;

a magnetic core positioned in the opening in the valve body;

windings encircling the magnetic core;

a valve spring biasing the armature away from the magnetic core; and a retainer ring holding the windings in the opening in the valve body;

the windings, when they are energized, producing a magnetic circuit that includes the valve body, magnetic core, armature, and retainer ring.

2. The actuator of claim 1 wherein the magnetic core is retained in position by magnetic attraction between the core and the valve body.

3. The electromagnetic actuator for a fluid pressure control valve in a fuel injector for an internal combustion engine, the actuator comprising:

a control valve module having a valve body with a bore at least partially extending therethrough and an annular opening extending partially into the valve body, the annular opening creating an integral magnetic core;

a control valve having an armature attached thereto, the control valve being inserted into the bore in the valve body;

a valve spring biasing the armature away from the magnetic core; and windings inserted into the opening;

the windings, when they are energized, producing a magnetic circuit that includes the valve body and the armature.

4. The actuator of claim 3 further including a retainer ring inserted into the annular opening of the valve body to hold the windings, wherein the magnetic circuit includes the valve body, the armature, and the retainer ring.

5. An electromagnetic actuator for a fluid pressure control valve in a fuel injector for an internal combustion engine, the actuator comprising:
- a valve body having an opening therein and a bore at least partially extending therethrough;
- a control valve having an armature attached thereto, the control valve being inserted into the bore in the valve body;
- a magnetic core inserted into the opening in the valve body;
- a valve spring biasing the armature away from the magnetic core; and
- windings encircling the magnetic core, the windings, when energized, producing a magnetic circuit that includes the valve body, magnetic core, and armature.

6. The electromagnetic actuator set forth in claim 5 wherein the opening in the valve body is sized to provide for a minimum reduction of core material to effect maximum flux density.

7. The actuator as set forth in claim 5 wherein the core is formed of magnetized material whereby the core is held in place in the valve body opening by magnetic attraction between the core and the valve body with a minimal air gap clearance therebetween;
- an air gap between the armature and the core being greater than the air gap clearance between the core and the valve body.

* * * * *